United States Patent
Lee (10) Patent No.: US 10,341,991 B2
(45) Date of Patent: Jul. 2, 2019

(54) DYNAMIC UPLINK/DOWNLINK SUBFRAME CONFIGURATION

(71) Applicant: Telefonaktiebolaget LM Ericsson (publ), Stockholm (SE)

(72) Inventor: Munhan Lee, Suwon-si (KR)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 15/576,641

(22) PCT Filed: Jun. 5, 2015

(86) PCT No.: PCT/IB2015/054282
§ 371 (c)(1),
(2) Date: Nov. 22, 2017

(87) PCT Pub. No.: WO2016/193793
PCT Pub. Date: Dec. 8, 2016

(65) Prior Publication Data
US 2018/0124764 A1 May 3, 2018

(51) Int. Cl.
*H04W 72/04* (2009.01)

(52) U.S. Cl.
CPC ... *H04W 72/0406* (2013.01); *H04W 72/0486* (2013.01); *H04W 72/048* (2013.01); *H04W 72/0446* (2013.01)

(58) Field of Classification Search
CPC ... H04L 5/0037; H04L 5/0053; H04L 5/0091; H04L 5/1469; H04W 72/042; H04W 76/28
See application file for complete search history.

(56) References Cited

U.S. PATENT DOCUMENTS

| 6,016,311 A | 1/2000 | Gilbert et al. |
| 2016/0020953 A1* | 1/2016 | Zhu ........................ H04W 24/02 370/280 |
| 2016/0095152 A1* | 3/2016 | McDonnell ............ H04L 5/001 370/294 |

(Continued)

FOREIGN PATENT DOCUMENTS

| WO | 2013143114 A1 | 10/2013 |
| WO | 2013143132 A1 | 10/2013 |

OTHER PUBLICATIONS

International Preliminary Report on Patentability for Application No. PCT/IB2015/054282, dated Dec. 14, 2017, 7 pages.

(Continued)

*Primary Examiner* — Kan Yuen
(74) *Attorney, Agent, or Firm* — Nicholson De Vos Webster & Elliott LLP (57) ABSTRACT

An apparatus for an uplink (UL) and downlink (DL) subframe configuration in a radio access network considering UL/DL throughputs is disclosed. The apparatus includes a storage unit configured to store information on UL and DL data, and a processor configured to obtain UL throughput and DL throughput based on the information, to calculate a UL and DL subframe allocation ratio indicative of numbers of UL and DL subframes to be allocated to a time division duplex (TDD) window based on the UL throughput and DL throughput, and to determine UL and DL subframe configuration based on the UL and DL subframe allocation ratio.

21 Claims, 6 Drawing Sheets

(56) References Cited

U.S. PATENT DOCUMENTS

2016/0100360 A1* 4/2016 Liu .................. H04W 52/0258
                                                        370/311
2017/0373890 A1* 12/2017 Fertonani ................ H04L 25/02

OTHER PUBLICATIONS

International Search Report and Written Opinion for Application No. PCT/IB2015/054282, dated Jan. 29, 2016, 10 pages.

* cited by examiner

DYNAMIC UPLINK/DOWNLINK SUBFRAME CONFIGURATION

CROSS-REFERENCE TO RELATED APPLICATIONS

This application is a national stage of International Application No. PCT/IB2015/054282, filed Jun. 5, 2015, which is hereby incorporated by reference.

TECHNICAL FIELD

The present disclosure generally relates to wireless communications, and more particularly to an apparatus and a method for dynamic uplink (UL) and downlink (DL) subframe configurations for a time division duplex (TDD) system.

BACKGROUND

Recently, as communications, computer networks and semiconductor technologies are rapidly developed, various services can be provided via wireless communication networks and consumer's demands for these services are increasing day by day. Further, the wireless internet service market is exploding around the world recently, and more service providers providing services for a mobile communication system using the wireless communication networks become active in developing multimedia communication services, which include a voice call service and a data transmission service for transmitting various types of data. With increasing volume of UL and DL data transmissions provided by the data transmission service, the data traffic in the wireless communication networks is increased. As such, there have been made efforts for processing the increased data traffic considering a system load through research and development.

In the wireless communication networks, such as Long-Term Evolution (LTE), the UL and DL data transmissions may be performed with two duplex modes (i.e., frequency division duplex (FDD) mode and time division duplex (TDD) mode). The FDD mode uses a paired spectrum where different carrier frequencies are used for the UL and DL data transmissions. The TDD mode, on the other hand, uses an unpaired spectrum where a single carrier frequency is used for both UL and DL data transmissions and the UL and DL data transmissions is separated in time. In the TDD mode, a subframe in a radio frame can either be an uplink, a downlink or a special subframe.

Conventionally, the UL/DL subframe configuration in the LTE TDD is determined by using the total weighted UL/DL traffic sizes, which are calculated from UL/DL buffer sizes of each user equipment (UE) and a priority of the UL/DL traffic. In this case, however, since the UL/DL configuration is determined without considering UL/DL channel circumstances for UL/DL data communication (e.g., UL and DL throughputs), it is possible that the radio resources cannot be efficiently allocated in the radio frame.

SUMMARY

The present disclosure relates to dynamic uplink/downlink (UL/DL) configuration for time division duplex (TDD) in a long term evolution (LTE) network using UL/DL buffer sizes and UL/DL throughputs.

According to one embodiment of the present disclosure, there is provided an apparatus for uplink (UL) and downlink (DL) subframe configuration in a radio access network. The apparatus includes a storage unit configured to store information on UL and DL data, and a processor configured to obtain UL throughput and DL throughput based on the information, to calculate a UL and DL subframe allocation ratio indicative of numbers of UL and DL subframes to be allocated to a time division duplex (TDD) window based on the UL throughput and DL throughput, and to determine UL and DL subframe configuration based on the UL and DL subframe allocation ratio.

According to another embodiment of the present disclosure, there is provided a method for uplink (UL) and downlink (DL) subframe configuration in a radio access network. The method includes obtaining UL throughput and DL throughput based on UL data and DL data; calculating a UL and DL subframe allocation ratio indicative of numbers of UL and DL subframes to be allocated to a time division duplex (TDD) window based on the UL throughput and DL throughput; and determining UL and DL subframe configuration based on the UL and DL allocation ratio.

DETAILED DESCRIPTION

Hereinafter, embodiments of the present disclosure will be described in detail with reference to the accompanying drawings. However, a detailed explanation of well-known functions or constructions will be omitted if there is a concern that such explanation may unnecessarily obscure the gist of the present disclosure.

According to an embodiment of the present disclosure, a mobile communication network may include a second generation (2G) wireless communication network such as a global system for mobile communication (GSM), a code division multiple access (CDMA) or the like, a long term evolution (LTE) network, a wireless internet such as WiFi or the like, a portable internet network such as wireless broadband internet (WiBro), a world interoperability for microwave access (WiMax) or the like, a mobile communication network that supports packet transmission (e.g., third generation (3G) mobile communication network such as Wideband Code Division Multiple Access (WCDMA) or CDMA2000, or a 3.5G mobile communication network such as high speed downlink packet access (HSDPA) or high speed uplink packet access (HSUPA), a fourth generation (4G) mobile communication network that is currently used, a fifth generation (5G) mobile communication network that will be used near future, or any other mobile communication network including macro base stations (macro Evolved Node B (eNodeB)), small cell base stations (Pico eNodeB, Home-eNodeB), user equipment (UE) and the like. However, the mobile communication network is not limited thereto. Hereinafter, the embodiment will be described on a basis of an evolved universal terrestrial radio access network (E-UTRAN) that is an LTE radio access network.

Figure 1:
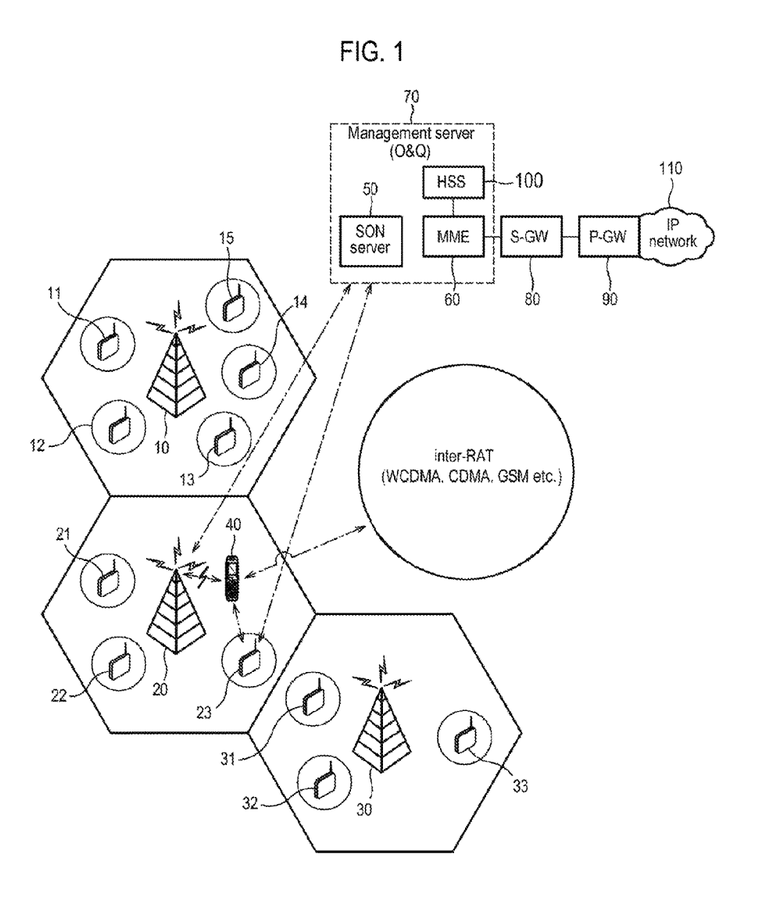
FIG. 1 is a diagram illustrating a configuration of a mobile communication network according to an embodiment of the present disclosure.

As illustrated in FIG. 1, the mobile communication network may be configured with one or more network cells and include a heterogeneous network (HetNet) in which different network cells are mixed. The mobile communication network includes small base stations (e.g., Pico eNodeB, Home-eNodeB, relay, etc.) 11 to 15, 21 to 23 and 31 to 33 for managing small network cells (e.g., Pico cells, Femto cells, etc.), macro base stations (e.g., macro eNodeB) 10, 20 and 30 for managing macro cells, a self organizing and optimizing networks (SON) server 50, a mobility management entity (MME) 60, a serving gate way (S-GW) 80, a packet data network gateway (P-GW) 90 and a home subscriber server (HSS) 100. The respective elements in FIG. 1 are illustrative examples of the embodiment of the present disclosure, and the elements are not limited thereto.

The macro base stations 10, 20 and 30 may be, for example, base stations having cells within about 1 kilometer (Km) radius, which can be used in, for example, an LTE network, WiFi network, Wibro network, WCDMA network, CDMA network, UMTS network, GSM network, or the like.

The small base stations 11 to 15, 21 to 23 and 31 to 33 may be Pico base stations, Femto base stations, relays, which have cells within ten or more meters in a radius, and can be used in, for example, an LTE network, a WiFi network, a Wibro network, WCDMA network, a CDMA network, a UMTS network, a GSM network or the like.

The small base stations 11 to 15, 21 to 23 and 31 to 33, and the macro base stations 10, 20 and 30 may have independent connectivity with a core network such as the SON server 50, MME 60, S-GW 80, P-GW 90, HSS 100 and the like.

The UE 40 may be a mobile terminal, which is used in 2G wireless communication networks such as a GSM network, a CDMA network and the like, portable internet networks such as a WiBro network and a WiMax network, or mobile communication networks supporting the packet transmission.

A management server (O&Q) 70, which is a network management device of the small base stations 11 to 15, 21 to 23 and 31 to 33, serves to configure and manage the small base stations 11 to 15, 21 to 23 and 31 to 33 and the macro base stations 10, 20 and 30. The management server 70 can perform all functions which may be performed by the SON server 50, the MME 60 and the HSS 100. The SON server 50 includes an arbitrary server that can perform installation and optimization of the macro/small base stations, and function to provide basic parameters and data necessary for the respective base stations. The MME 60 includes an arbitrary entity that is used to manage mobility of the UE 40. Further, the MME 60 functions as a base station controller (BSC) and performs a resource allocation, a call control, a hand over control, a voice and packet process control and the like with respect to the base stations (e.g., Pico eNodeB, Home eNodeB, Macro eNodeB, etc.).

According to an embodiment of the present disclosure, the SON server 50, the MME 60 and the HSS 100 can manage one or more macro base stations 10, 20 and 30 and one or more small base stations 11 to 15, 21 to 23 and 31 to 33.

Although the network cells are described as having the macro cells, Pico cells and Femto cells in the above embodiment, the network cells can be configured with any combination of the macro cells, Pico cells and Femto cells, for example, macro cells and Pico cells, macro cells and Femto cells, or any other combination thereof.

Specifically, the small base stations 11 to 15, 21 to 23, and 31 to 33 can broadcast a system information block (SIB) indicative of system information on a Femto cell area managed by themselves, and the SIB includes a closed subscriber group (CSG) indicator indicative of a limited set of users with connectivity access to the corresponding Femto cells. The SIB is a message which includes information on the Femto cell of each small base station and is broadcast to every UE 40. The SIB includes a cell global identity (CGI) which is a factor to uniquely identify a cell in the networks, a CSG indication which is a factor to identify whether the cell is a CSG cell or not, a CSG identity (ID) that is an identifier broadcast by a CSG cell and used by the UE 40 to facilitate an access for authorized members of the associated CSG.

Assuming that the mobile communication network is an LTE network, the LTE network interworks with inter-radio access technology (RAT) networks (e.g., a WiFi network, a WiBro network, a WCDMA network, a CDMA network, a UMTS network, a GSM network, etc.). Further, if one of the inter-RAT networks, for example, the WiBro network, is a mobile communication network, the WiBro network also interworks with other networks (e.g., a LTE network, a WiFi network, a WCDMA network, a CDMA network, a UMTS network, a GSM network, etc.). Although, it is illustrated in the figure such that one network (e.g., LTE network) is spaced apart from other networks (e.g., a WiFi network, a WiBro network, a WCDMA network, a CDMA network, a UMTS network, a GSM network, etc.), it may be assumed that one network and other networks overlap.

In this embodiment, the small base stations 11 to 15, 21 to 23 and 31 to 33 and/or the macro base stations 10, 20 and 30 are referred as "base station apparatuses," and an evolved UMTS terrestrial radio access network (E-UTRAN), which is configured with LTE base station apparatuses (eNBs 25-1 to 25-n in FIG. 2), has an Internet Protocol (IP)-based flat structure and processes data traffic between the UE 40 and the core network. The MME 60 performs a signal control between the UE 40 and the core network. The MME 60 controls signals between the eNBs 25-1 to 25-n and the S-GW 80, and determines where to route the data received from the UE 40. The S-GW 80 performs anchor functions for the UE mobility between eNBs 25-1 to 25-n, and between a 3GPP network and the E-UTRAN, and accesses an IP network 110 through the P-GW 90. The MME 60 and the S-GW 80, which are the equipment of the core network, manage a plurality of eNBs 25-1 to 25-n, and each of the eNB 25-1 to 25-n is configured with several cells. An S1 interface (S1-MME and S1-U in FIG. 2) is used for communication between the eNBs 25-1 to 25-1 and the MME 60/S-GW 80, and X2 interface (not illustrated) is used for performing a handover between the eNBs 25-1 to 25-n and a SON function.

Figure 2:
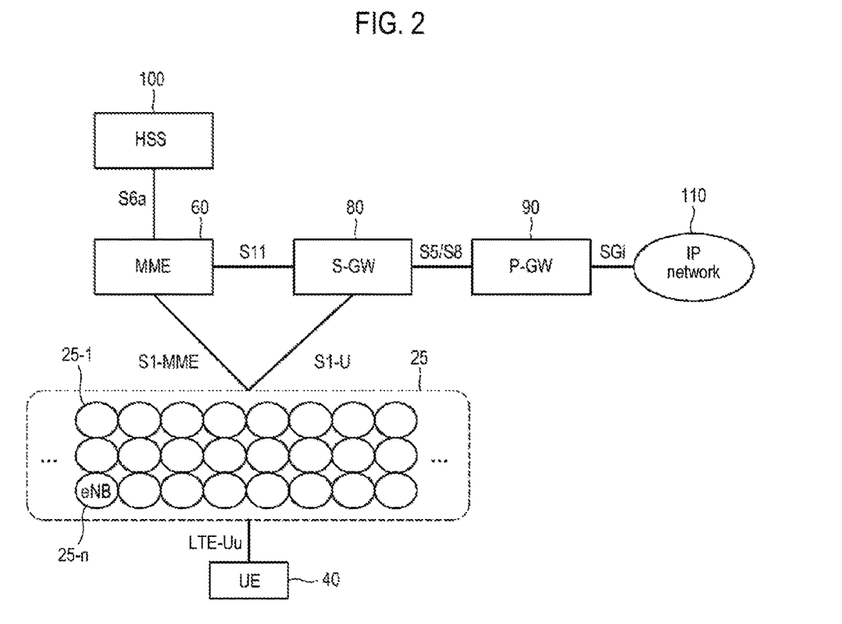
FIG. 2 is a diagram illustrating a configuration of an evolved packet core (EPC) network according to an embodiment of the present disclosure.

The network interface is set up by setting the S1 interface for connection with the MME 60, which is a center of the system, and the X2 interface, which is a network line for direct communications between the eNBs 25-1 to 25-n of different cells, which exist on a current system. Operation and management (OAM) information for support the mobility of the UE 40 is transmitted and received by exchanging signals with the MME 60 via the S1 interface. Further, the X2 interface performs functions of exchanging signals for a fast handover, load indicator information between the eNBs 25-1 to 25-n, and information for self-optimization.

FIG. 2 is a diagram showing a configuration of an evolved packet core (EPC) network according to an embodiment of the present disclosure.

The E-UTRAN 25 is a radio access network configured with IP-based eNBs 25-1 to 25-n, and is located between the UE 40 and a radio communication core network to thereby transfer data and control information. Further, when the UE 40 uses a voice service in the LTE system, the E-UTRAN 25 supports: a paging request for a circuit switch (CS) fallback so as to receive the voice service by moving to the conventional 2G/3G mobile communication network; a function of transferring a short message service (SMS) message to the UE 40; and a direct connection to a target cell in which a CS service is possible.

In FIG. 2, "LTE-Uu" indicates a wireless interface between the E-UTRAN 25 and the UE 40, "S1-MME" indicates an interface between the MME 60 and the E-UTRAN 25, "S1-U" indicates an interface between the S-GW 80 and the E-UTRAN 25, "S11" indicates an interface between the S-GW 80 and the MME 60, "S5/S8" indicates an interface between the P-GW 90 and the S-GW 80, and "SGi" indicates an interface between the IP network 110 and the P-GW 90. Further, "56a" indicates an interface between the HSS 100 and the MME 60.

The UE 40 and the eNBs 25-1 to 25-n of the E-UTRAN 25 communicate with each other via a radio resource control (RRC) protocol. A broadcasting message from each of the eNBs 25-1 to 25-n to a cell controlled by themselves is defined as a RRC message. The RRC message includes control messages delivered from a non-access stratum protocol, and the control messages are not read out in the E-UTRAN 25 but transparently transferred to the UE 40 or the core network.

The eNBs 25-1 to 25-n are end points with respect to the radio signals of the E-UTRAN 25, the control signals are communicated with the MME 60 via the S1-MME interface and the data traffic is communicated with the S-GW 80 via the S1-U interface. The S-GW 80 performs an anchor function with respect to mobility within the E-UTRAN 25 and a buffering function with respect to the downlink traffic. The P-GW 90 is a connection point with an external network (e.g., IP network 110) and performs IP allocation, charging to the mobile subscribers, and a traffic control function with respect to the user data.

The IP network 110 provides an IP multimedia subsystem (IMS) service with respect to the UE 40 within the EPC network, and includes a Policy & Charging Rule Function (PCRF), IP multimedia subsystem (IMS) nodes (e.g, Proxy Call Session Control Function (P-CSCF), an interrogating call session control function (I-CSCF), a serving call session control function (S-CSCF), an application function (AF).

The UE 40 transmits and receives call control messages for the multimedia service to/from the IMS nodes via EPC bearers, which are provided by E-UTRAN/S-GW/P-GW, using a Gm interface.

The E-UTRAN 25 provides the radio communication function to the UE 40, and performs a function of managing radio resources therefor.

The MME 60 receives authentication information for authenticating the UE 40 from the HSS 100 to perform authentication upon the UE 40. Further, the MME 60 manages the mobility of the UE 40 and the eNBs 25-1 to 25-n at an upper level, and performs call control function such as setup/release of evolved packet system (EPS) session and bearers. The mobility and session control between the UE 40 and the network is performed by a network-attached stratum (NAS) protocol at a NAS layer, which is located at a control plane of the UE 40 and the MME 60, and the UE 40 and the MME 60 communicate with each other via a NAS message. A NAS function can be classified into the EPS mobility management (EMM) and the EPS session management (ESM).

Further, the MME 60 can be directly connected to the IP network 110 via the S-GW 80 and the P-GW 90. The call process control signal of the eNBs 25-1 to 25-n is transferred to the S-GW 80 via the MME 60, and an operation request necessary for the call process is transmitted to the P-GW 90 according to the call process control signal. The EMM is a sub-layer located at the NAS layer. As an EMM procedure is performed, the UE 40 has seven EMM states and the MME 60 has four EMM states. A signaling connection should be formed to exchange the NAS message between the UE 40 and the MME 60, and this connection is called as an EPS connection management (ECM) connection. The ECM connection, which is a logical connection, is actually configured with an RRC connection set between the UE 40 and the eNBs 25-1 to 25-n, and an S1 signaling connection set between the eNB 25-n and the MME 60. That is, a setup or release of the ECM connection means that both the RRC connection and the S1 signaling connection are set up or released. When the ECM connection is set up, the RRC connection is set up in terms of the UE 40, and the S1 signaling connection is set up in terms of the MME 60. The ECM connection has an ECM-Connected state (connection setup) and an ECM-Idle state (connection release). The ECM-Connected state and the ECM-Idle state are frequently switched back and forth according to the EMM procedure, and this switching process is called a state transition.

The S-GW 80 acts as a gateway between the 3GPP network and the E-UTRAN 25, and may also act as a mobility anchor for providing a handover between the eNBs 25-1 to 25-n and mobility of the UE 40 between the 3GPP networks (inter-3GPP). The S-GW 80 makes sure that the P-GW 90 performs operations necessary for the call processes according to the control signals of the eNBs 25-1 to 25-n.

The P-GW 90 allocates an IP address to the UE 40, and applies different Quality of Service (QoS) policies to each UE 40. Further, the P-GW 90 acts as a gateway toward a packet data network (PDN) such that the UE 40 can access the internet or the data network like the Internet to thereby receive a service.

Although it is described that the S-GW 80 and the P-GW 90 are separated and communicate via the S5/S8 interfaces according to an embodiment of the present application, the S-GW 80 and the P-GW 90 may be implemented a part of a single gateway.

The HSS 100 manages authentication information for authenticating the UE 40, and location information and profiles of the UE 40. The profiles of the UE 40 may include QoS level information corresponding to the service product subscribed by the UE 40 (e.g., priority, guaranteed bit rate, etc.). According to an embodiment of the present disclosure, the authentication information for authenticating the UE 40 and the profiles of the UE 40 may be transferred from the HSS 100 to the MME 60 when the UE 40 accesses the network.

A policy and charging rules function (PCRF, not denoted) manages policies and rules for charging the subscribers for using the networks, and enables the P-GW 90 and the S-GW 80 to provide a proper QoS to the UE 40 and to perform a charging function with respect to the used bearers.

The IMS nodes (not denoted) are configured with nodes such as P-CSCF, I-CSCF, S-CSCF, AF and the like and provide multimedia services such as a voice over IP (VoIP) service, a video calling service and the like.

Data exchanged between the base stations (i.e., macro base stations 10, 20 and 30, or the small base stations 11-15, 21-23 and 31-33) and the UE 40 are transferred via an air interface by using a predefined radio frame. In a time division duplex (TDD) system (e.g., LTE TDD system, 5G TDD system, etc.), the radio frame is divided into a plurality of subframes (e.g., ten subframes, fifty subframes or the like). A subframe configuration in the radio frame is performed by a scheduler, which may be included in the macro base stations 10, 20 and 30, or the small base stations 11-15, 21-23 and 31-33. The subframe configuration may be performed in a unit of a radio frame or in a unit of a half of the radio frame, and an interval for configuring the subframes in the radio frame will be referred to a TDD window. That is, the TDD window length may be a radio frame or a half of the radio frame. However, the TDD window is not limited thereto. Hereinafter, an embodiment of the scheduler, which can be applicable to the LTE TDD system (or the 5G TDD system), will be described by referring to FIGS. 3 to 5.

Figure 3:
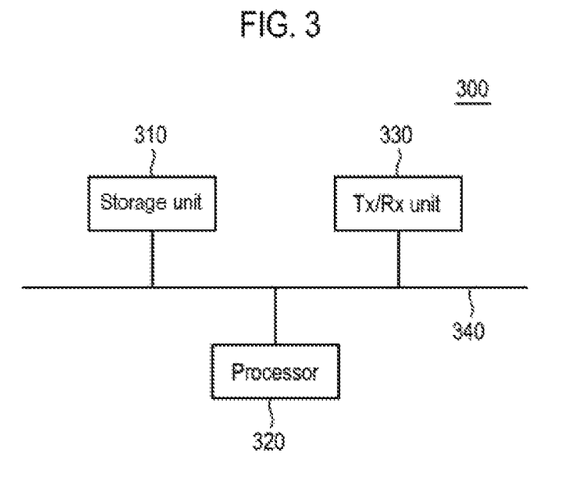
FIG. 3 is a block diagram illustrating a scheduling apparatus according to an embodiment of the present disclosure.

FIG. 3 is a diagram showing a configuration of a scheduler according to an embodiment of the present disclosure.

As shown in FIG. 3, the scheduler 300 includes a storage unit 310, a processor 320, a transmission/reception (Tx/Rx) unit 330 and a system bus 340. The storage unit 310, the processor 320 and the Tx/RX unit 330 are connected to each other via the system bus 340.

The storage unit 310 stores information on an uplink (UL) buffer size and a downlink (DL) buffer size and information on data received in the UL and data transmitted in the DL during a previous TDD window. The information on the UL buffer size is included in a buffer status report (BSR), which are periodically received by the base stations (10, 20, 30, 11 to 15, 21 to 23, 31 to 33) from the UE 40 at a predetermined cycle. The BSR indicates to the base station how much data it still has available in the buffer of the UE 40 after the data transmission. A transmission period of the BSR from the UE 40 may be set to be equal to or longer than the TDD window length, however, the transmission period is not limited thereto. The data received in the UL and the data transmitted in the DL may be represented by a UL transport block (TB) having a plurality of resource blocks (RBs) and a DL transport block (TB) having a plurality of RBs. The storage unit 310 may include at least one of a random access memory (RAM), a CD-ROM, a magnetic tape, a floppy disc, an optical data storage and the like, but is not limited thereto.

The processor 320 is configured to obtain the UL buffer size from the information on the previously received BSR, which is stored in the storage unit 310. On the other hand, the DL buffer resides in the base stations, so that the processor 320 can directly obtain the DL buffer size without any delay.

Further, the processor 320 is configured to calculate the UL throughput based on the data received in the UL link and the DL throughput based on the data transmitted in the DL link during the previous TDD window, which are stored in the storage unit 310. The UL throughput and the DL throughput represent an average UL TB size per subframe and an average DL TB size per subframe, respectively, during the previous TDD window.

According to an embodiment of the present disclosure, the UL throughput can be calculated using an equation similar to the following equation (1):

$$\text{Average } UL \text{ } TB \text{ Size} = \sum_{i=1}^{NUM\_UL\_SF} \frac{UL\_TBS(i) \times BW}{UL\_RB(i)} \div NUM\_UL\_SF \quad (1)$$

In the equation (1), UL_TBS(i) represents a UL transport block size scheduled in a subframe i, UL_RB(i) represents the number of a UL resource blocks scheduled in a subframe i, BW represents a total UL bandwidth in the UL resource blocks, and NUM_UL_SF represents the number of UL subframes within the a TDD window. Herein, i is an integer equal to or greater than 1.

Further, according to an embodiment of the present disclosure, the DL throughput can be calculated using an equation similar to the following equation (2):

$$\text{Average } DL \text{ } TB \text{ Size} = \sum_{i=1}^{NUM\_DL\_SF} \frac{DL\_TBS(i) \times BW}{DL\_RB(i)} \div NUM\_DL\_SF \quad (2)$$

In the equation (2), DL_TBS(i) represents a DL transport block size scheduled in a subframe i, DL_RB(i) represents the number of DL resource blocks scheduled in subframe i, BW represents a total DL Bandwidth in the DL resource blocks, and NUM_DL_SF represent the number of DL subframes within the TDD window. Herein, i is an integer equal to or greater than 1. In the equations (1) and (2), the sum of NUM_UL_SF and NUM_DL_SF becomes a TDD window length, which is, for example, 10 ms in the LTE system.

When the UL/DL buffer sizes and the UL/DL throughputs are calculated, the processor 320 calculates the UL required number of subframes and the DL required number of subframes, which are required to empty the UL buffer and the DL buffer, respectively, based on the UL/DL buffer sizes and the UL/DL throughputs, using equations similar to the following equations (3) and (4):

$$UL \text{ REQUIRED } NUM \text{ } SF = \sum \frac{UL \text{ Buffer Size\_UE}(x)}{\text{Average } UL \text{ } TB \text{ Size\_UE}(x)} \quad (3)$$

$$DL \text{ REQUIRED } NUM \text{ } SF = \sum \frac{DL \text{ Buffer Size\_UE}(x)}{\text{Average } DL \text{ } TB \text{ Size\_UE}(x)} \quad (4)$$

In equation (3), UL REQUIRED NUM SF represents the UL required number of subframes to empty the whole UL buffer (i.e., transmit all of data from the UL buffer), UL Buffer Size_UE(x) represents a UL buffer size for a specific UE 40, which is obtained from the BSR previously received from the specific UE 40, and Average UL TB Size_UE(x) represents an average TB size per UL subframe for the specific UE 40, which is calculated using the equation (1).

In equation (4), DL REQUIRED NUM SF represents the DL required number of subframes to empty the whole DL buffer (i.e., transmit all of data from the DL buffer), DL Buffer Size_UE(x) represents a DL buffer size with respect to a specific UE 40, and Average DL TB Size_UE(x) represents an average TB size per DL subframe for the specific UE 40, which is calculated using the equation (2).

After calculating the UL required number of subframes and the DL required number of subframes, the processor 320 calculates the UL number of subframes and the DL number of subframes to be allocated to the next TDD window, using equations similar to the following equations (5) and (6):

$$UL\ NUM\ SF = \frac{UL\ \text{REQUIRED}\ NUM\ SF}{UL\ \text{REQUIRED}\ NUM\ SF + DL\ \text{REQUIRED}\ NUM\ SF} \times NUM\ SF\ \text{in}\ TDD\ \text{Window} \quad (5)$$

$$DL\ NUM\ SF = NUM\ SF\ \text{in}\ TDD\ \text{Window} - UL\ NUM\ SF \quad (6)$$

In equation (5), UL NUM SF represents the UL number of subframes to be allocated to the next TDD window, UL REQUIRED NUM SF represents the UL required number of subframes to empty the UL buffer, which is calculated using the equation (3), DL REQUIRED NUM SF represents the DL required number of subframes to empty the DL buffer, which is calculated using the equation (4), and NUM SF in TDD Window represents the number of subframes included in the TDD window. In equation (6), UL NUM SF represents the UL number of subframes to be allocated in the next TDD window, which is calculated using the equation (5), NUM SF in TDD Window represents the number of subframes included in the TDD window, and UL NUM SF represents the number of subframes to be allocated to the next TDD window.

For example, assuming that data stored in the UL buffer are 400 bits and the UL throughput is 100 bits/subframe, the UL number of subframes, which is required to empty the UL buffer becomes four subframes (400 bits/100 bits). Further, assuming that the data stored in the DL buffer are 1000 bits and the DL throughput is 1000 bits/subframe, the DL number of subframes, which is required to empty the DL buffer becomes one subframe (1000 bits/1000 bits). That is, a ratio of the UL number of subframes and the DL number of subframes becomes 4:1. Thus, when ten subframes are included in the TDD window, eight UL subframes and two DL subframes can be allocated according to an embodiment of the present disclosure. Further, fifty (50) subframes are included in the TDD window, which may be served in 5G mobile communication network, forty (40) UL subframes and ten (10) subframes can be allocated to the next TDD window.

If the transmission period of the BSR is longer than the TDD window length, the UL buffer size extracted from the BSR, which is previously received, can be obsolete at the time when the scheduler 300 decides the UL/DL subframe allocation ratio (i.e., TDD configuration decision). In that case, the processor 320 estimates the UL buffer size by using an equation similar to the following equation (7) instead of directly using the UL buffer size included in the previously received BSR:

$$S(n) = B(m) - T(n) + \frac{B(m) - B(m-1) + R(m)}{P} \times K \quad (7)$$

Figure 4:
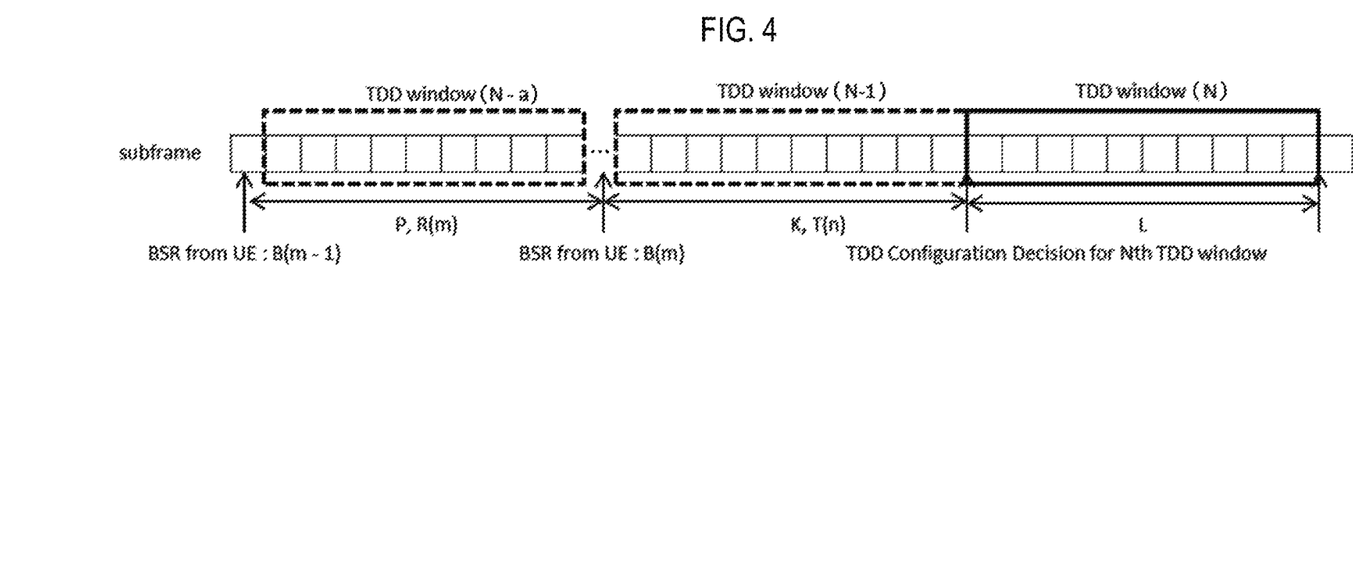
FIG. 4 is a diagram illustrating a procedure for estimating a UL buffer size estimation according to an embodiment of the present disclosure.

In equation (7), S(n) represents an estimated UL buffer size for $N^{th}$ TDD window, B(m) represents the UL buffer size reported from the UE 40 through the latest BSR before starting of the $N^{th}$ TDD window, R(m) represents a sum of sizes of UL data received between B(m) and B(m−1), T(n) represents a sum of sizes of UL data received after the last BSR is received, P represents a BSR report period in a subframe, and K represents a time difference of a subframe between the TDD configuration decision time and the latest BSR reception (see FIG. 4). Herein, m and n are positive integers. Further, this estimation assumes that the UL buffer increase evenly over time.

When the UL buffer size is estimated, the processor 320 may calculate the number of UL required subframes, which is required to empty the UL buffer based on the estimated UL buffer size, using an equation similar to the following equation (8). In order to avoid allocating most of the subframes with the UL subframes, the maximum number of the UL required subframes can be determined using an equation similar to equation (8) below:

$$\text{Number of } UL \text{ Required } SF = \quad (8)$$
$$\text{MIN}\left(\sum_{x=1}^{NUM\_MAX\_UE} \frac{\text{Estimated } UL \text{ Buffer Size}(x)}{\text{Average } UL\ TB \text{ Size}(x)}, \text{Maximum } UL\ SF\right)$$

In equation (8), Estimated UL buffer size(x) represent the S(n) calculated using the equation (7) for a specific UE 40, Average UL TB size(x) represents the UL throughput calculated using the equation (1) for the specific UE 40, Maximum UL SF represents the maximum limit for the number of the UL required subframes, MIN(a,b) represent a function that, if a<b, it returns a, otherwise, it returns b.

Further, the processor 320 may calculate the number of DL required subframes, which is required to empty the UL buffer based on the DL buffer size while avoiding allocating most of the subframes with the DL subframes, using an equation similar to the following equation (9).

$$\text{Number of } DL \text{ Required } SF = \quad (9)$$
$$\text{MIN}\left(\sum_{x=1}^{NUM\_MAX\_UE} \frac{DL \text{ Buffer Size}(x)}{\text{Average } DL\ TB \text{ Size}(x)}, \text{Maximum } DL\ SF\right)$$

In equation (9), Average DL TB Size(x) represents the DL throughput for the specific UE 40, Maximum DL SF represents the maximum limit for the number of the DL required subframes, and MIN(a,b) represents a function that, if a<b, it returns a, otherwise, it returns b.

After calculating the number of UL required subframes and the number of DL required subframes using the equations (8) and (9), the processor 320 calculates the number of UL subframes and the number of DL subframes to be allocated to the next TDD window using equations similar to the following equations (10) and (11):

$$\text{Number of } UL\ SF = \frac{\text{Number of } UL \text{ Required } SF}{\text{Number of } DL \text{ Required } SF + \text{Number of } UL \text{ Required } SF} \times L \quad (10)$$

$$\text{Number of } DL\ SF = L - \text{Number of } UL\ SF \quad (11)$$

When the number of UL subframes and the number of DL subframes are determined in the equations (10) and (11), the processor 320 determines a UL/DL subframe pattern within the next TDD window according to the predetermined rule. The predetermined rule includes that, for example, a first subframe is allocated to a DL subframe, a third subframe is allocated to a UL subframe, a special switching subframe is allocated when switching from the DL to the UL and the like.

The Tx/Rx unit 330 is configured to receive the UL data and the BSR, and to transmit the DL data to the UE 40.

Figure 5:
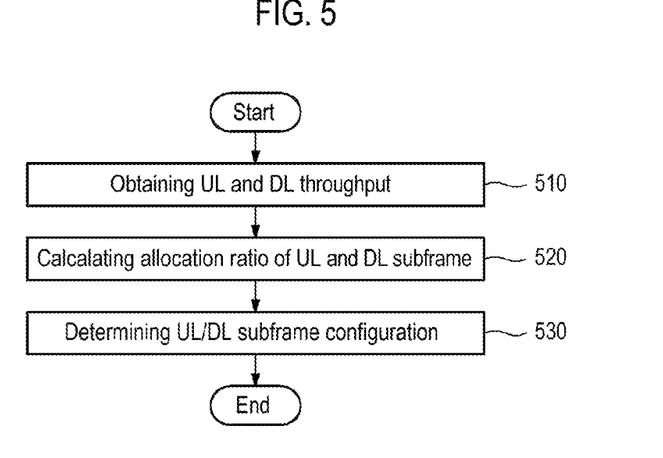
FIG. 5 is a flowchart illustrating a procedure of determining a UL/DL subframe configuration for a next TDD window according to an embodiment of the present disclosure.

FIG. 5 is a flowchart illustrating a method of determining a UL/DL subframe configuration for a next TDD window according to an embodiment of the present disclosure.

As shown in FIG. 5, the scheduler 300 obtains the UL throughput and the DL throughput during the previous TDD window at 510. The scheduler 300 calculates an allocation ratio of a UL subframe and a DL subframe based on the UL throughput and DL throughput, at 520. And then, the scheduler 300 determines the UL/DL subframe configuration for a next TDD window based on the allocation ratio, at 530.

Figure 6:
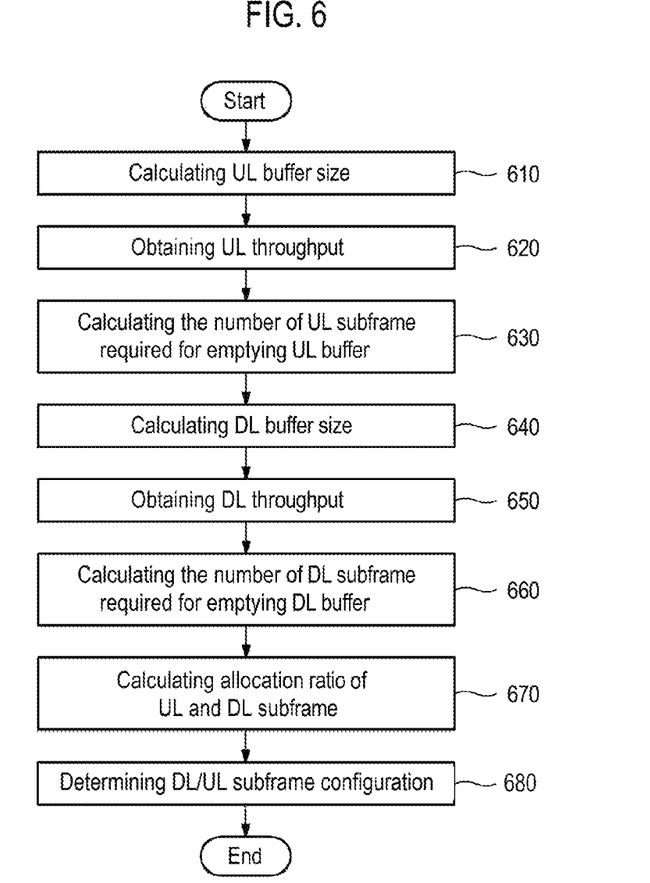
FIG. 6 is a flowchart illustrating a procedure of determining a UL/DL subframe configuration using UL/DL buffer sizes and throughputs according to an embodiment of the present disclosure.

FIG. 6 is a flowchart illustrating a method of determining a UL/DL subframe configuration using UL/DL buffer sizes and throughputs according to an embodiment of the present disclosure.

As shown in FIG. 6, the processor 320 included in the scheduler 300 calculates a UL buffer size based on the information on the previously received BSR, which is stored in the storage unit, at 610. In one embodiment of the present application, if the transmission period of the BSR from the UE 40 is equal to or shorter than the TDD window, the processor 320 obtains the UL buffer size from the previously received BSR. On the other hand, if the transmission period of the BSR from the UE 40 is longer than the TDD window, the processor 320 estimates the UL buffer size during the previous TDD window using a UL buffer size obtained from a most recently received BSR, data received during a most recent first cycle and data received from the most recently received BSR to a current scheduling time.

The processor 320 calculates the UL throughput based on the data received in the UL link, which is stored in the storage unit 310, at 620. In an embodiment of the present disclosure, the UL throughput represents an average UL TB size per subframe during the previous TDD window.

The processor 320 calculates the UL required number of subframes, which is required to empty the UL buffer based on the UL buffer size and the UL throughput, at 630.

The processor 320 obtains a DL buffer size based on information indicative of an amount of data transmitted in the DL during the previous TDD window, which is stored in the storage unit 310 included in the scheduler 300, without delay at 640.

The processor 320 calculates the DL throughput based on the data transmitted in the DL link during the previous TDD window, which are stored in the storage unit 310, at 650. In an embodiment of the present disclosure, the DL throughput represents an average DL TB size per subframe during the previous TDD window.

Thereafter, the processor 320 calculates the UL required number of subframes and the DL required number of subframes, which are required to empty the UL buffer and the DL buffer, respectively, based on the UL/DL buffer sizes and the UL/DL throughputs, at 660.

Next, the processor 320 calculates an allocation ratio of the UL subframe and the DL subframe to be allocated to the next TDD window based on the calculated the UL required number of subframes and the DL required number of subframe, at 670.

Thereafter, the processor 320 determines the UL/DL subframe configuration for the next TDD window based on the allocation ratio, at 670.

As described above according to an embodiment of the present disclosure, since the UL/DL subframes are allocated in consideration of not only the UL/DL buffer sized but also the UL/DL throughputs, the UL/DL subframes can be efficiently allocated to maximize the system capacity in the TDD system.

Although the present disclosure has be described with respect to certain embodiments, it will be understood that various modifications and changes may be made without departing from the spirit and scope of the present disclosure, as those skilled in the art will appreciate. Further, it is considered that such modifications and changes fall within the scope of the claims appended hereto.

What is claimed is:

1. An apparatus for an uplink (UL) and downlink (DL) subframe configuration in a radio access network, comprising:
   a memory configured to store an information on a UL data and a DL data; and
   a processor configured to:
      obtain a UL throughput and a DL throughput based on the information, wherein the UL throughput is obtained based on calculating an average UL transport block (TB) size per each UL subframe received during a previous time division duplex (TDD) window, and the DL throughput is obtained based on calculating an average TB size per each DL subframe transmitted during the previous TDD window,
      estimate a UL buffer size responsive to a determination that a UL buffer size obtained from a most recently received buffer status report (BSR) is obsolete,
      calculate a UL and DL subframe allocation ratio indicative of numbers of UL and DL subframes to be allocated to a TDD window based on the estimated UL buffer size, a DL buffer size, the UL throughput and the DL throughput, and
      determine the UL and DL subframe configuration based on the UL and DL subframe allocation ratio.

2. The apparatus of claim 1, wherein the UL data and the DL data are data received in a UL and data transmitted in a DL, respectively, during the previous TDD window.

3. The apparatus of claim 2, wherein the UL throughput is an average amount of data transmitted in the UL per each UL subframe, and the DL throughput is an average amount of data transmitted in the DL per each DL subframe.

4. The apparatus of claim 3, wherein the UL and DL subframe configuration is determined for a next TDD window.

5. The apparatus of claim 4, wherein the processor is configured to obtain the DL buffer size based on an amount of data transmitted in the DL during the previous TDD window.

6. The apparatus of claim 5, wherein the most recently received BSR is one of a plurality of BSRs periodically received by the apparatus.

7. The apparatus of claim 6, wherein the processor is further configured to:
   calculate a number of UL subframes required to empty a UL buffer based on the estimated UL buffer size and the UL throughput;
   calculate a number of DL subframes required to empty a DL buffer based on the DL buffer size and the DL throughput; and
   calculate the UL and DL subframe allocation ratio based on the calculated numbers of the UL subframes and DL subframes.

8. The apparatus of claim 7, wherein a maximum number of the UL subframes to empty the UL buffer is limited to a first predetermined number less than a number of subframes included in a TDD window, and a maximum number of the DL subframes to empty the DL buffer is limited to a second predetermined number less than a number of subframes included in the TDD window.

9. The apparatus of claim 6, wherein the processor is further configured to determine the estimated UL buffer size using the UL buffer size obtained from the most recently received BSR, data received during a most recent first cycle and data received after receiving the most recently received BSR, when the first cycle is longer than a TDD window length.

10. The apparatus of claim 1, wherein a length of a TDD window is one of: one radio frame and a half of a radio frame.

11. The apparatus of claim 1, wherein the processor is further configured to determine a UL and DL subframe pattern in the UL and DL configuration according to a predetermined rule.

12. A method for an uplink (UL) and downlink (DL) subframe configuration in a radio access network, comprising:
    obtaining a UL throughput and a DL throughput based on a UL data and a DL data, wherein the UL throughput is obtained based on calculating an average UL transport block (TB) size per each UL subframe received during a previous time division duplex (TDD) window, and the DL throughput is obtained based on calculating an average TB size per each DL subframe transmitted during the previous TDD window;
    estimating a UL buffer size responsive to a determination that a UL buffer size obtained from a most recently received buffer status report (BSR) is obsolete;
    calculating a UL and DL subframe allocation ratio indicative of numbers of UL and DL subframes to be allocated to a TDD window based on the estimated UL buffer size, a DL buffer size, the UL throughput and the DL throughput; and
    determining the UL and DL subframe configuration based on the UL and DL subframe allocation ratio.

13. The method of claim 12, wherein the UL data and DL data are data received in a UL and data transmitted in a DL, respectively, during the previous TDD window.

14. The method of claim 13, wherein the UL throughput is an average amount of data transmitted in the UL per each UL subframe, and the DL throughput is an average amount of data transmitted in the DL per each DL subframe.

15. The method of claim 14, wherein the UL and DL subframe configuration is determined for a next TDD window.

16. The method of claim 15, wherein the DL buffer size is obtained based on an amount of data transmitted in the DL during the previous TDD window.

17. The method of claim 16, wherein the most recently received BSR is one of a plurality of BSRs periodically received at a first cycle.

18. The method of claim 17, wherein the calculating the UL and DL subframe allocation ratio includes:
    calculating a number of UL subframes required to empty a UL buffer based on the estimated UL buffer size and the UL throughput;
    calculating a number of DL subframes required to empty a DL buffer based on the DL buffer size and the DL throughput; and
    calculating the UL and DL subframe allocation ratio based on the calculated numbers of the UL subframes and DL subframes.

19. The method of claim 18, wherein a maximum number of the UL subframes to empty the UL buffer is limited to a first predetermined number less than a number of subframes included in a TDD window, and a maximum number of the DL subframes to empty the DL buffer is limited to a second predetermined number less than a number of subframes included in the TDD window.

20. The method of claim 17, wherein the estimated UL buffer size is determined using the UL buffer size obtained from the most recently received BSR, data received during a most recent first cycle and data received after receiving the most recently received BSR, when the first cycle is longer than a TDD window length.

21. The method of claim 12, wherein a length of a TDD window is one of: one radio frame and a half of a radio frame.

* * * * *